US 6,720,066 B2

(12) United States Patent
Talpaert et al.

(10) Patent No.: US 6,720,066 B2
(45) Date of Patent: *Apr. 13, 2004

(54) SUBSTRATE WITH A PHOTOCATALYTIC COATING

(75) Inventors: Xavier Talpaert, Paris (FR); Michel Simonet, Creteil (FR); Corinne Lehaut, Paris (FR); Thierry Chopin, Saint-Leu la Forêt (FR); Frédéric Magnin-Feysot, Combs la Ville (FR)

(73) Assignees: Saint-Gobain Glass France, Courbevoie (FR); Rhodia Chimie, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/234,159

(22) Filed: Sep. 5, 2002

(65) Prior Publication Data

US 2003/0082367 A1 May 1, 2003

Related U.S. Application Data

(63) Continuation of application No. 09/655,146, filed on Sep. 5, 2000, now Pat. No. 6,465,088.

(30) Foreign Application Priority Data

Mar. 5, 1998 (FR) .............................. 98/02676

(51) Int. Cl.⁷ ................................ B32B 5/18
(52) U.S. Cl. ............... 428/307.3; 428/304.4; 428/312.2; 428/312.8; 428/318.4; 428/318.6; 428/319.1; 428/328; 428/639; 428/640
(58) Field of Search ............ 428/307.3, 304.4, 428/312.2, 312.8, 318.4, 318.6, 319.1, 328, 639, 640

(56) References Cited

U.S. PATENT DOCUMENTS

| 5,643,644 A | 7/1997 | Demars ........................ 428/34 |
| 5,885,657 A | 3/1999 | Penth ....................... 427/372.2 |
| 6,037,289 A | 3/2000 | Chopin et al. ................. 502/2 |
| 6,103,363 A | 8/2000 | Boire et al. ................. 428/325 |

FOREIGN PATENT DOCUMENTS

| EP | 0 645 516 | 3/1995 |
| FR | 2 681 534 | 3/1993 |
| WO | WO 96/00198 | 1/1996 |
| WO | WO 97/10185 | 3/1997 |
| WO | WO 97/10186 | 3/1997 |
| WO | WO 98/23549 | 6/1998 |

*Primary Examiner*—D. S. Nakarani
(74) *Attorney, Agent, or Firm*—Pennie & Edmonds LLP

(57) ABSTRACT

The present invention is directed to a process for obtaining a substrate provided with a coating having photocatalytic properties, wherein the coating includes crystallized particles of an oxide of a metal A having photocatalytic properties. The crystallized particles are incorporated into the coating using a mineral binder comprising at least one oxide of a metal B also having photocatalytic properties in the crystallized state. The coating optionally includes at least oxide of a metal M devoid of photocatalytic properties and/or at least one silicon compound of the silicon oxide $SiO_2$ type. The coating is deposited from liquid-phase dispersions containing the crystallized particles of the oxide of metal A and at least one precursor compound for the oxide of metal B of the binder and optionally a precursor compound for the oxide of metal M and for the Si compound, in a relative proportion A/(B+M+Si) by weight of the metals and Si ranging between 60/40 and 40/60. The present invention is also directed to substrates containing a photocatalytic coating and to liquid-phase dispersions which are used in the preparation of the photocatalytic coatings.

20 Claims, 2 Drawing Sheets

SUBSTRATE WITH A PHOTOCATALYTIC COATING

This is a continuation of application Ser. No. 09/655,146, filed Sep. 5, 2000, now U.S. Pat. No. 6,465,088 B1.

FIELD OF THE INVENTION

The present invention relates to substrates provided with a photocatalytic coating and the process for obtaining such a coating and its various applications. In particular, the present invention relates to coatings comprising semiconductor materials based on a metal oxide, which upon irradiation at a suitable wavelength, is capable of initiating radical reactions.

BACKGROUND OF THE INVENTION

Coatings confer novel functionalities on the materials to which they are applied. These functionalities include antisoiling, fungicidal, and bactericidal properties and are optionally combined with uses such as repelling water, providing an anti-fogging layer, and optically modifying a substrate.

A wide variety of materials may be used as coating substrates. Examples of these materials are those used in vehicles or buildings, such as glazing products, walling, cladding, roofing and flooring materials such as tiles, slates, slabs and pavings. Practically any material used in the construction industry can be used as a substrate. These materials may be made of glass, metal, glass-ceramic, ceramic, cement brick, wood, stone, as well as materials reconstituted from natural materials, plastic, or fibrous materials.

Transparent substrates are typically used as glazings. These transparent substrates include glass and flexible or rigid plastic such as those made of polyester or acrylate. A particular example of an acrylate substrate is polymethyl methacrylate (PMMA).

Substrates may be classified according to their porosity. Thus, substrates may be characterized as porous, non-porous, or slightly porous. Substrates may also be regarded as a single material such as a glass substrate, or as a composite material such as a walling material which is provided with a coating of the wall-render type.

Coatings containing crystallized anatase $TiO_2$ which have photocatalytic properties have been disclosed in patent applications WO 97/10186 and WO 97/10185. The coatings described in those references are obtained from the thermal decomposition of suitable organometallic precursors and/or from precrystallized $TiO_2$ particles embedded in a mineral or organic binder.

SUMMARY OF THE INVENTION

The present invention is directed to substrates comprising coatings having photocatalytic properties. The coatings may additionally possess anti-soiling, bactericidal, fungicidal, anti-fogging, or water-repellant properties. They may be used also to modify the optical properties of a substrate. The coatings of the present invention comprise at least one component having photocatalytic properties and a binder which is also photocatalytic. Optional components may be incorporated into the coating. The substrates of the present invention comprise various types of materials such as glass, plastic, textile, composite materials, and walling, cladding, or roofing materials.

The present invention is also directed to a process for preparing substrates which comprises a coating as described above. Further, the present invention relates to liquid-phase dispersions used in the preparation of the coatings for the substrates of the present invention.

The coatings applied to the substrates of the present invention exhibit both a satisfactory level of photocatalytic activity and an enduring coating durability. Simultaneous optimization of the photocatalytic activity and coating durability, properties which were previously believed to be incompatible, was achieved mainly by optimizing the relative proportions of the components comprising the coatings.

DETAILED DESCRIPTION OF THE PREFERRED EMBODIMENTS

Figure 1:
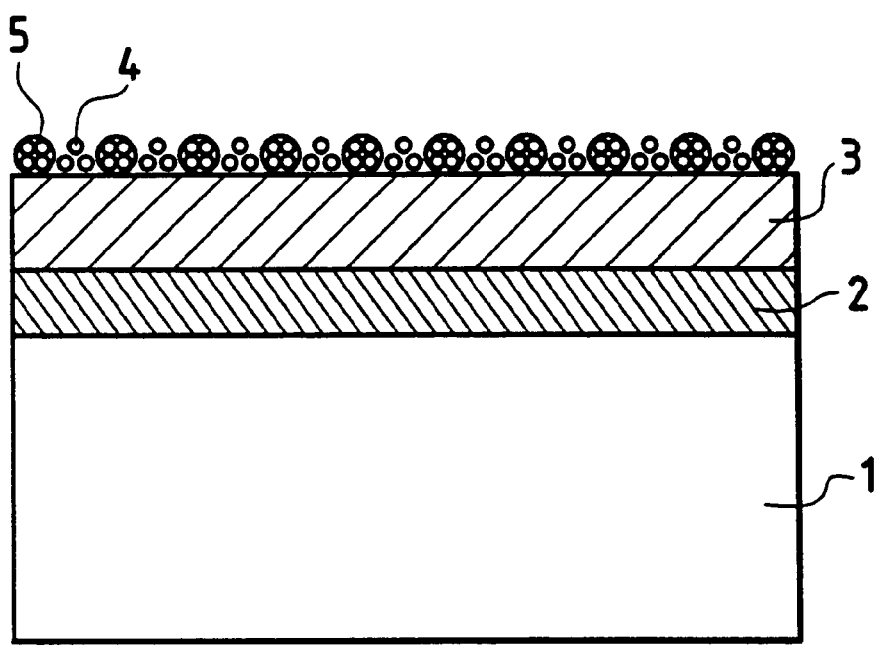
FIG. 1: A schematic of the structure of the photocatalytic coating.

An object of the invention is to enhance the properties of coatings by extending their photocatalytic performance after repeated exposure to aging conditions encountered in various types of applications. In particular, the photocatalytic performance of the coatings are improved partly by enhancing their mechanical or chemical durability.

The process of the present invention comprises obtaining a substrate having a surface at least part of which is coated with a photocatalytic coating. The photocatalytic coating comprises crystallized particles of an oxide of a metal A having photocatalytic properties. These crystallized particles are incorporated into the coating using a mineral binder comprising at least one oxide of a metal B also having photocatalytic properties in the crystallized state. This binder may optionally comprise at least one oxide of a metal M devoid of photocatalytic properties or at least one silicon (Si) oxide compound.

The process of the present invention comprises depositing the coating from one or more liquid-phase dispersions comprising: (a) crystallized particles of the oxide of metal A; (b) at least one precursor compound for the oxide of metal B which forms at least part of the mineral binder and (c) optionally a precursor compound for the oxide of metal M and/or for the Si compound. Preferably, the ratio of the weight of metal A to the weights of the other components such as B, M, or Si ranges between 60/40 and 40/60.

Preferably, the coating deposition/treatment conditions are chosen such that the mineral binder, particularly the oxide of B which forms at least part of the binder, is at least partially crystallized in the final coating. Preferably, the oxides of metals A and B are chosen from at least one of the following: titanium oxide, zinc oxide, tin oxide, and tungsten oxide. A particularly preferred oxide of A or B is a titanium oxide, the anatase crystal form of which is highly photocatalytic. Examples of the metal M oxides which are devoid of intrinsic photocatalytic properties are aluminum oxide or zirconium oxide.

The present invention has allowed the simultaneous optimization of two coating properties, photocatalytic performance and coating durability, which previously appeared to be incompatible. More specifically, the present invention has succeeded in extending the photocatalytic properties of the coating over time. Because the catalytic effect of the coating might be mostly due to the incorporated particles which had already crystallized and had been catalytically active from the very beginning, the temptation is to maximize the amount of particles in the coating. Surprisingly, both excessively high and excessively low amounts of particles have turned out to be unsuitable for achieving both the desired photocatalytic properties and coating durability. At least two factors have made it difficult to find an optimal ratio of the coating's components: (a) the amount and type of particles of the oxide of metal A probably influence the morphology of the binder, and (b) the change in the photocatalytic character of the coating and in its retention over time is not a linear function of a parameter such as (a).

The process of the present invention demonstrates that it is possible to select a ratio such as A/(B+M+Si) which allows both a satisfactory level of photocatalytic activity and an enduring photocatalytic activity. The reasons for this are not completely understood. It is possible that the mineral binder also contributes to the coating's photocatalytic activity. The coatings of the present invention has the additional advantage of possessing excellent optical properties such as high light transmission and very low haze level.

The precursors for the oxide of metal B, and those for the optional oxide or oxides of metal M, are preferably organometallic compounds capable of decomposing into an oxide under suitable treatment such as a heat treatment. A silicon alkoxide (silane) may be used as a precursor for the Si compound, particularly for the $SiO_2$.

Preferably, the process of the present invention uses crystallized particles of the oxide of A. Particularly preferred is $TiO_2$ crystallized predominantly in the anatase form. Preferably, the particles are in the form of agglomerates of crystallites preferably having a mean size of approximately 5 nm to 80 nm. The crystallites preferably have a mean size of between about 5 nm to 20 nm, more preferably between 5 nm to 10 nm, in a liquid phase dispersion, preferably in an aqueous-based colloidal suspension or in a dispersion having at least one organic solvent. The particle sizes correspond approximately to the diameters of the agglomerates and crystallites in question, although the particles or agglomerates may assumes shapes other than spherical such as lenticular or rods.

Rather than speak of agglomerates of crystallites, one may instead refer to the agglomerates as particles and to the crystallites as crystalline coherence domains. To a first approximation, the agglomerates are assumed to have undergone little or no structural or dimensional change in the final coating. In fact when the process for preparing the photocatalytic coating involves heat treatment, the particles structurally change, with the crystallites' size increasing appreciably. For example, from an initial approximate size of 5 nm to 10 nm, the $TiO_2$ crystallites' size changes to about 10 nm to 20 m in the final coating. The crystallites' size has thus approximately doubled. A detailed description of these particles are found in WO 97/10185, WO 98/23549, or FR-2, 681,534.

Preferably, a precursor organometallic compound for the oxide of metal B, and optionally for the oxide of metal M, is chosen from the group consisting of tetraalkoxides of formula $X(OR)_4$, wherein X refers to a metal and R is a linear or branched alkyl-type carbon-containing radical. The R's may be identical or different and preferably comprises from 1 to 6 carbon atoms. Examples of these precursors are titanium tetrabutoxide or titanium tetraisopropoxide. The precursors may also be chosen from trialkoxides of the formula $MR'(OR)_3$, where R and R' are radicals which are identical to or different from those in the abovementioned tetraalkoxides. The precursors can also be halides, preferably titanium chlorides.

Because the above precursors are highly hydrolysable and reactive, they are preferably dissolved with at least one chelating or stabilizing agent. Examples of these chelating or stabilizing agents are β-diketones such as acetylacetone (2,4-pentanedione), benzoylacetone (1-phenyl-1,3-butanedione), and diisopropylacetylacetone. One may also use acetic acid, diethanolamine, or glycols such as ethylene glycol or tetraoctylene glycol as chelating or stabilizing agent. The precursor concentration in the solution for a given solids content is adjusted by using one or more organic solvents as diluent.

In one embodiment of the present invention, the mineral binder of the coating comprises only an oxide of metal B. Thus, the A/(B+M+Si) ratio mentioned above reduces to A/B. In another embodiment of the present invention, the mineral binder comprises an oxide of metal B of the $TiO_2$ type, and a silicon compound of the $SiO_2$ type, the A/(B+M+Si) ratio thus becoming A/(B+Si).

A particularly preferred embodiment of the process of the present invention comprises depositing the coating from two dispersions, one comprising at least one precursor and another comprising the particles, the two dispersions being premixed into a single dispersion before spraying onto the substrate. Alternatively, the substrate is immersed in this combined dispersions, although one may deposit a coating using several separate dispersions without premixing them.

One type of deposition technique is called hot deposition. In this technique, the substrate, during the dispersion/substrate contact, is at a temperature high enough to allow thermal decomposition of the precursor(s). This is a liquid-phase pyrolysis type technique.

Another technique is cold deposition. In this technique, the substrate, during the dispersion/substrate contact, is at room temperature or at the very least at a temperature too low to cause decomposition of the precursor(s). This is a sol-gel type technique. This method of deposition includes dipping, cell-coating, laminar-coating, or spray-coating.

A heat treatment following contact between the dispersion and substrate is necessary in a cold deposition techniques. The heat treatment cures the coating and ensures that the precursors have completely decomposed. But heat treatment is also advantageous in a hot deposition techniques because it may improve the cohesion of the coating and induce at least the partial crystallization of the binder arising from the decomposition of the precursor(s). Preferably, the heat treatment is carried out at temperatures not lower than 400° C., more preferably above 450° C., and most preferably in the region of 500° C. to 550° C. if the substrate is able to withstand these temperatures such as when the substrates have a glass, ceramic or glass-ceramic matrix.

The present invention is also directed to a substrate provided on at least part of its surface with a photocatalytic coating. The coating preferably incorporates crystallized particles of an oxide of a metal A with photocatalytic properties. Preferably, the crystallized particles are incorporated using an at least partially crystallized mineral binder comprising an oxide of a metal B also having photocatalytic properties in the crystallized state. Preferably, the substrate is obtained according to the process described above.

The substrate of the present invention is characterized by high porosity preferably greater than 40%, and more preferably between 45% and 65%. This porosity can be calculated indirectly from a measurement of the refractive index of the layer and then comparison with what the index would be if the material were fully dense. Because the index measurement also takes into account, at least partly, the degree of surface roughness of the layer, this indirect method also provides a reliable measure of the porosity and surface morphology of the layer. Other indirect methods may be used, especially those which involve measuring the weight of the coating deposited per unit area of the substrate relative to a given coating thickness.

A high porosity substrate has many advantages. First, it makes it possible to decrease the refractive index of the material and thus vary its optical appearance. In a $TiO_2$-based coating comprising $TiO_2$ particles (crystallized predominantly as anatase), a $TiO_2$-based binder, and an optional Si oxide, decreasing the substrate's index below 2, preferably about 1.4 to 1.8, and more preferably about 1.7 to 1.8, allows a substrate's reflectivity to be very greatly diminished.

Also, the porosity of the coating is linked with high surface roughness. A high surface roughness in turn correlates with a highly developed surface area of the coating which favors photocatalytic activity.

There are at least two different kinds of roughness. They are described in patent WO 98/23549. Surface roughness gives a coating an enhanced and lasting hydrophobic property thus providing the coating a pronounced water-repellant and anti-fogging properties. The hydrophobicity of the coating also promotes the removal of dirt from rainwater. Surprisingly, this high porosity does not excessively weaken the coating mechanically.

The present invention is also directed to a substrate on at least part of its surface is provided a coating having photocatalytic properties. This substrate's coating comprises crystallized particles of an oxide of a metal A having photocatalytic properties. The crystallized particles are incorporated using an at least partially crystallized binder comprising at least one oxide of a metal B also having photocatalytic properties in the crystallized state. In one embodiment of the present invention, the substrate further comprises at least one oxide of a metal M devoid of photocatalytic properties and/or a silicon oxide compound. Preferably, the substrate's coating is obtained according to the process described above.

Preferably, the ratio given by A/(B+M+Si) ranges between 60/40 and 40/60 in terms of the weight of the metals (and optionally the Si) contained in the oxides of A, B, M, or Si.

The substrate of the present invention may have a fibrous appearance or a certain porosity, as in the case of a tile or a mineral insulation wool. As used herein, providing a substrate with a photocatalytic coating may mean that the coating is deposited on the substrate's surface, or alternatively that the coating may partly impregnate a substrate to within a certain depth when the substrate is porous or fibrous. Thus, the amount of coating deposited may be expressed either in terms of its thickness of the coating layer on the substrate when the latter is not porous, or by the amount of material per unit area when the substrate is porous.

Preferably, the coating of the invention, whether obtained by the process described above or whether it is of a type having the characteristics described above, comprises the following characteristics and components: (a) crystallized particles with size between 5 nm and 80 nm; (b) crystalline coherence domains with size between 5 nm and 20 nm; and (c) a mineral binder at least partly in the form of grains located around the crystallized particles in the inter-particle interstices, the grains having a mean size between 5 nm and 25 nm, preferably between 10 nm to 20 nm. In a preferred embodiment of the present invention, these grains, which are approximately spherical, are only partially crystallized. They may also be partially crystallized on a scale too small to measure. Preferably, the grains encapsulate the particles and bind them together, particularly in the case where the oxides of A and B are both based on $TiO_2$.

Preferably, the substrate is provided with a photocatalytic coating which comprises $TiO_2$ particles essentially in anatase form, and a mineral binder comprising partially crystallized $TiO_2$ and $SiO_2$. Preferably, the coating has an index of at most 2, more preferably between 1.5 and 1.9, and most preferably between 1.6 and 1.8.

In one embodiment of the present invention, at least one layer is inserted between the substrate and the photocatalytic coating. The one or more layers may have one or more functions such as modifying the substrate's optical properties, acting as a barrier to prevent species such as alkali metals from migrating from the substrate, as an antistatic, or as an adhesion layer. At least one layer may be based on Si compounds such as $SiO_2$, SiON, SiOC and $Si_3N_4$, or on an optionally doped metal oxide such as $F:SnO_2$ or $Sb:SnO_2$.

The substrates provided with the coatings may comprise a transparent material such as glass or plastic. The coating of the present invention may be applied as part of a glazing used in buildings or vehicles. The coatings may also be used in monitor displays such as television screens, computer screens, or touch screens. The coatings may form part of a laminated or monolithic glazing (i.e. a glazing comprising a single glass pane or a single sheet of plastic). The coating of the present invention may also form part of an insulating multiple glazing structure in which the coating is either on an internal or external face of the glazing. The coatings may be used in a conventional insulating glazing having one or more gas interlayers such as those marketed by Saint-Gobain Vitrage under the names BIVER, CLIMALIT D, CONTRATHERM, CONTRASONOR, CONTRARISC. Further, the coatings of the present invention may be used in glazings having one or more vacuum interlayers (referred to here as vacuum glazings) such as the one described in EP-645,516. In the case of vacuum glazing, it is particularly advantageous to apply the coating on an external face of the glazing for purposes such as to prevent the formation of fog on the substrate's surface.

Another substrate to which the coatings of the present invention may be applied are glazings used in freezers or refrigerators. In fact, many materials may act as substrates for the coatings of the present invention. These materials include ceramic, plastic, cement, and other construction or building materials such as walling, cladding, or roofing materials. Other materials suitable for use with the coatings of the present invention include interior or exterior floors or walls of dwellings such as slabs or tiling.

The coating of the present invention may be deposited on fibrous materials, such as a mineral wool material, which may be used for applications such as thermal or acoustic insulation. The coating may also be applied to fibers of the textile-yarn type as a reinforcement or for other applications such as filtration. Further, one may take advantage of the antisoiling, bactericidal, fungicidal, or antifogging properties of the coating where desired or needed.

The present invention is also directed to liquid-phase dispersions such as those described above. The dispersions can be used in the preparation or manufacture of the photocatalytic coating of the present invention. Preferably, the dispersions comprise a solvent selected from one of the following: water, ethylene glycol, ethanol, propylene glycol and their combinations.

The crystalline phase of the titanium dioxide particles of the dispersions is preferably predominantly in the anatase crystal form. "Predominantly" means that the anatase content of the titanium dioxide particles of the coating is greater than 50% by weight. Preferably, the particles of the coating have an anatase content greater than 80%. The crystallinity and the nature of the crystalline phase are measured by X-ray diffraction.

The dispersions of the present invention are generally obtained by mixing a dispersion of the titanium dioxide particles with solutions comprising at least one precursor compound and/or a silicon compound. Depending on the nature of the compounds used, one may add during the mixing step additives such as cosolvents, surfactants, or stabilizers. The mixing may be improved by stirring the dispersion ultrasonically.

EXAMPLES

A first series of examples below relates to the deposition on a transparent substrate 1 of antisoiling coating 3 comprising a titanium oxide. Substrate 1 is made of clear, flat silica-soda-lime glass 15×40 $cm^2$ in area and 4 mm thick. Other types of substrate may be used. The substrates used may have varying degrees of curvature.

Between coating 3 and substrate 1, there may optionally be a thin layer 2 based on silicon oxycarbide (SiOC) to act a barrier to the diffusion of alkali metals (this being deleterious to the photocatalytic property of the coating), and/or a layer which has an optical function. The one or more layers may be deposited by known technique such as chemical vapor deposition (CVD). The one or more layers preferably have a thickness of approximately 50 nm.

Two different cold deposition processes were used. These were deposition by dipping in cell-coating mode with a bath draining rate of about 5 to 30 cm/minute, and deposition by spray-coating, more specifically cold liquid spraying. These well-known techniques are explained in detail in the patent applications referred to above.

The coatings are deposited from a dispersion obtained by mixing two initial solutions/dispersions 1 and 2:
   solution 1: contains the organometallic precursor for the $TiO_2$-based mineral binder. This precursor is titanium isopropylate $Ti(OCH(CH_3)_2)_4$ stabilized with acetylacetonate $CH_3—CO—CH_2—CO—CH_3$ in an ethanol solution;
   solution 2: this is the ethylene glycol liquid phase containing the photocatalytic crystallized particles having the following characteristics:
   specific surface area of the particles: $\geq 350$ $m^2/g$
   size of the particles: ~40 nm
   size of the crystallites which constitute the particles: 7 nm
   crystalline phase: more than 80% anatase.

TABLE 1

|  | $Ti_{(2)}/Ti_{(1)}$ | e (nm) | $T_L$ (%) | haze (%) |
| --- | --- | --- | --- | --- |
| EXAMPLE 1 | 0/100 | 20 | 88.5 | 0.88 |
| EXAMPLE 2 | 20/80 | 20 to 30 | 89.6 | 0.27 |
| EXAMPLE 3 | 40/60 | 40 to 50 | 89.5 | 0.76 |
| EXAMPLE 4 | 50/50 | 40 to 60 | 90.2 | 0.50 |
| EXAMPLE 5 | 60/40 | 60 | 90.5 | 0.61 |

TABLE 1-continued

|  | $Ti_{(2)}/Ti_{(1)}$ | e (nm) | $T_L$ (%) | haze (%) |
| --- | --- | --- | --- | --- |
| EXAMPLE 6 | 80/20 | 30 to 40 | 89.7 | 0.44 |
| EXAMPLE 7 | 100/0 | 30 to 40 | 90.3 | 1 | the $Ti_{(2)}/Ti_{(1)}$ ratio is as defined above (unitless).
e is the thickness of the coating, in nm.
$T_L$ is the light transmission in %, measured using the $D_{65}$ illuminant;
the haze value, in %, is given by the ratio of the diffuse transmission to the light transmission integrated over the entire visible range.

The composition of the dispersion obtained by mixing solution 1 with dispersion 2 is adjusted to obtain the desired $Ti_{(2)}/Ti_{(1)}$ ratio, which is the ratio of the weight of titanium (2) from the particles in the dispersion 2 to the weight of titanium (1) from the precursor in solution 1. The ratio may also be expressed in terms of the weight of titanium oxide originating from the particles to the weight of titanium oxide coming from the metal precursor, assuming that 100% of the precursor is converted into the oxide. The same ratio would be obtained, either way.

Examples 1 to 7 relate to deposition by dipping using a cell-coating mode under deposition conditions similar to those used above (such as a bath draining rate of 6 cm/minute) and a titanium concentration (namely 3% solids content, based on the weight of the oxide) identical to that in solution 1. After deposition, the substrates undergo a heat treatment at around 450–500° C. for at least 30 minutes.

Example 8 was produced from a dispersion prepared as in Example 4, but was deposited on a substrate by cold spraying using a so-called airless spray nozzle at a pressure of 0.7 bar ($0.7 \times 10^5$ Pa). The layer obtained, after heat treatment at around 450–500° C. for at least 30 minutes, has a thickness of approximately 35 n to 60 nm, with a $T_L$ value of 88.6%, and a haze value of 0.6%.

Examples 1 to 8 above were evaluated for their photocatalytic activity before and after exposure to conditions simulating those that lead to aging of the coating, although in this case the aging process is accelerated.

The photocatalytic activity is measured as follows:
1. using approximately 15 $cm^2$ of coating as test sample;
2. measuring the weight of the specimen, thickness of the substrate, $T_L$, and haze;
3. spray-depositing a solution of palmitic acid (8 g of acid per 1 liter of chloroform) with a glass/spray nozzle at a distance of 20 cm with the substrate vertical, using 3 to 4 successive passes;
4. weighing the specimen, after depositing the palmitic acid, to determine the thickness of the deposited acid (in nanometers);
5. measuring the haze and $T_L$ after deposition;
6. measuring the change in haze as a function of the UVA irradiation time (~30 V/$m^2$);
7. graphically determining the time at which the haze has decreased by 50%, this time being called $T/_{1/2}$ (disappearance);
8. evaluating the photocatalytic activity of the coating in terms of the rate of disappearance, v, defined by v (nm/h)=[palmitic acid thickness (nm)]/[$2 \times t_{1/2}$ (h)].

The aging of the coatings consists in subjecting them to mechanical abrasion under the following conditions:
   specimen size: 7 cm×15 cm;
   applied load: 600 grams
   area of the abrasion felt: 1.5 $cm^2$;
   number of cycles, n: 200 and 500 (1 cycle=1 forward and backward movement of the carrier arm of the felt and load).

Table 2 below gives, for each of the examples:
(a) the rate of disappearance v1 before abrasion;
(b) the rate of disappearance v2 after 200 cycles;
(c) the rate of disappearance v3 after 500 cycles.

Analyses of the results show that the coatings of Examples 3, 4, and 5 had a structure probably similar to that shown schematically in FIG. 1, which depicts a glass substrate 1, a SiOC layer 2 and a coating 3. The coating comprises particles or crystallite aggregates 5 between which amorphous or partly crystallized $TiO_2$ grains 4 agglomerate, these agglomerates forming the mineral binder of the coating.

Figure 2:
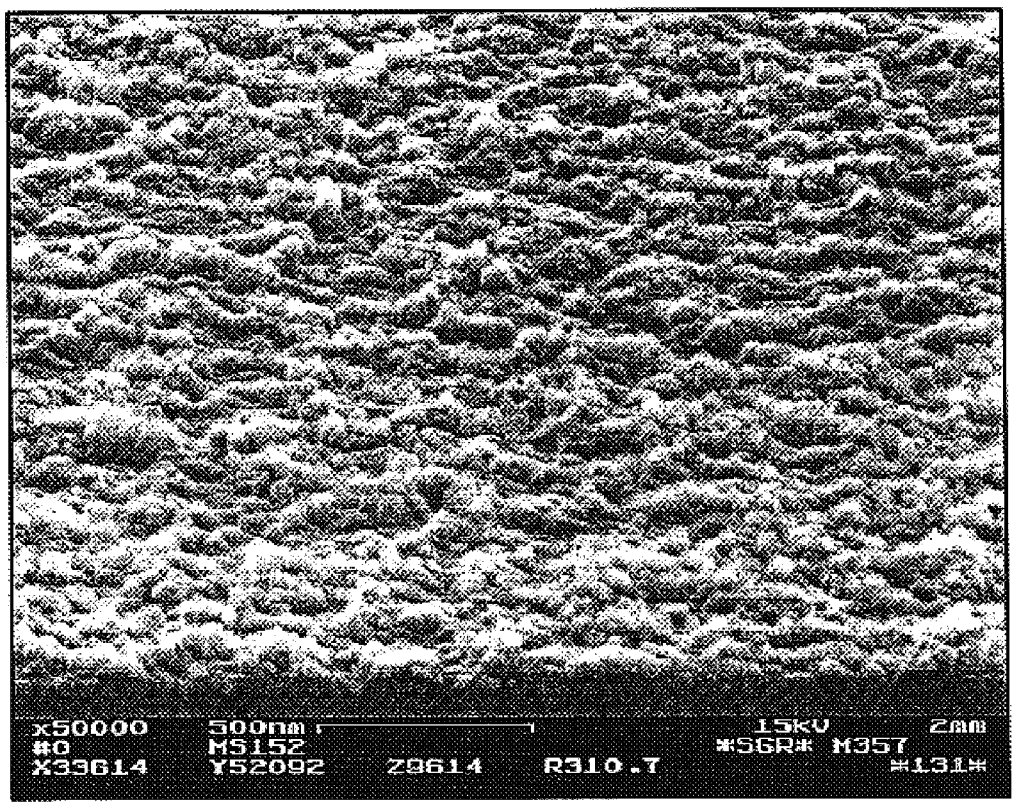
FIG. 2: A photograph of the surface of a photocatalytic coating obtained through a scanning electron microscopy (SEM).

FIG. 2, corresponding to Example 4, is a photograph obtained by scanning electron microscopy. The photograph provides information about the appearance of the surface of Example 4. As shown, the surface is relatively rough, allowing the coating to have a large developed surface area.

TABLE 2

|  | v1 (0 cycles) | v2 (200 cycles) | v3 (500 cycles) |
|---|---|---|---|
| EXAMPLE 1 | 20 | 10 | 0 |
| EXAMPLE 2 | 40 | 5–10 | 0 |
| EXAMPLE 3 | 35 | — | ≈10 |
| EXAMPLE 4 | 70 | 10–20 | ≈10 |
| EXAMPLE 5 | 35 | — | ≈5 |
| EXAMPLE 6 | 20 | 1–2 | 0 |
| EXAMPLE 7 | 20 | 0 | 0 |
| EXAMPLE 8 | 40 | — | 7 |

The coating of Example 4 has a refractive index of about 1.65. To a first approximation, one may calculate the porosity of the coating using the known refractive index of the bulk $TiO_2$ which is 2.4. Thus, the porosity is given by $(2.4-1.65)/(2.4-1) \times 100$ which is approximately 54%. The coating of Example 4 exhibits strong hydrophobicity. After exposing it to UVA rays for 20 minutes to activate it, the coating is placed in the dark and the contact angle $\phi$ with respect to water is periodically measured. The contact angle remained less than 10° for at least 20 days in the dark.

The following conclusions may be drawn from the data: Examples 3, 4, 6 and 8, and particularly Example 5, have $Ti_{(2)}/Ti_{(1)}$ ratios of 50/50. These examples possess all the properties desired in a coating, namely:

a high $T_L$, a low haze and a refractive index less than 2 giving the coating a desirable optical appearance;
satisfactory photocatalytic activity, which remains even after mechanical abrasion, which proves the durability of the coatings.

These results show the coatings can be used advantageously in actual, real-life applications. In fact, these examples retained their photocatalytic activity, albeit moderate, even after 500 abrasion cycles.

The second series of examples below relates to coatings prepared using the same solution 1 and the same dispersion 2 above. The deposition conditions are identical to those of Examples 1 to 7, except that the bath draining rate is higher, being equal to 24 cm/minute. Another difference is the substrate: it is the same glass but deposited beforehand with a 50 nm first layer of SiOC using CVD, and then deposited with a 450 nm second layer of fluorine-doped tin oxide $F:SnO_2$ by powder pyrolysis. In this series of examples, the amount Q of photocatalytic coating is evaluated not by measuring its thickness but by measuring the amount of material per unit area of the substrate, expressed in $\mu g/cm^2$.

The photocatalytic activity of the examples is measured before any abrasion test. This gives the value v1 defined above. The durability of the coating is tested qualitatively by wiping with a rag: "++" means that the coating is very strongly resistant, "+" means that it is acceptably resistant, and "−" means that most, if not all, of the coating has been removed after wiping with a rag.

Table 3 below gives, for Examples 9 to 13, the $Ti_{(2)}/Ti_{(1)}$ ratios as defined above in Table 1, the value Q, the value v1, and the rag-wiping test rating:

TABLE 3

|  | $Ti_{(2)}/Ti_{(1)}$ | e (nm) | $T_L$ (%) | haze (%) |
|---|---|---|---|---|
| EXAMPLE 9 | 0/100 | 22 | 18 | −⁺ |
| EXAMPLE 10 | 20/80 | 24 | 128 | + |
| EXAMPLE 11 | 40/60 | 23 | 159 | + |
| EXAMPLE 12 | 50/50 | 25 | 231 | + |
| EXAMPLE 13 | 100/0 | 23 | 222 | − |

With an identical or almost identical amount of coating deposited, optimum performance occurs for Examples 11 and 12 which have $Ti_{(2)}/Ti_{(1)}$ ratios of 40/60 and 50/50, respectively. This same tendency may be seen in the first series of examples. Only Example 12 exhibits a photocatalytic activity above 200 and an acceptable durability.

A third series of examples relates to a coating using $TiO_2$ particles from the dispersion used in all the previous examples, but with a hybrid binder combining $TiO_2$ with $SiO_2$.

The solution containing the precursors for the binder uses as:

solvent: ethanol and ethylene glycol in a 75/25 ratio by weight;
stabilizer: acetylacetonate;
$TiO_2$ precursor: titanium tetrabutoxide (TBT); and
$SiO_2$ precursor: tetraethylorthosilicate (TEOS).

The relative proportion of TBT to TEOS is adjusted so as to have a $TiO_2/SiO_2$ ratio of 15/85 by weight in the solution (using the assumption that all TPT is converted into $TiO_2$ and all TEOS into $SiO_2$).

Next, an amount of the solution is added to the particle dispersion used in the previous examples to give the desired ratio (denoted as r) given by $Ti_{partilies}/(Ti_{precursor}+Si_{precursor})$. The solids content of the solution is 3%.

The substrate and deposition conditions are identical to those in Examples 9 to 13.

Table 4 below gives the values of the ratio r, the rate v1, the light reflection of the coated substrate $R_L$(%), and $\Delta T_L$ which refers to the variation of $T_L$ observed after 500 cycles of the abrasion test performed as in the first series of examples. Table 4 also presents the ratio $r_1$ which expresses the ratio of the amount of Ti to the amount of Si in terms of the weights of their oxides:

$$r_1 = TiO_{2\ particles}/(TiO_{2\ binder}+SiO_{2\ binder})$$

The table also shows: $Q_1$, the total amount of $TiO_2$ in the coating (particles and $TiO_2$ resulting from the titanium precursor) in $\mu g/cm^2$; and $Q_2$, the calculated amount, as total weight of the coating, also in $\mu g/cm^2$.

TABLE 4

|  | r | $r_1$ | v1 | $R_L$ | $\Delta T_L$ | $Q_1$ | $Q_2$ |
|---|---|---|---|---|---|---|---|
| EXAMPLE 14 | 45.1/54.9 | 40/60 | 8 | 12.5 | 0 | 8.8 | 18.2 |
| EXAMPLE 15 | 55.3/44.7 | 50/50 | 40 | 10 | 1 | 9.3 | 16.3 |
| EXAMPLE 16 | 65/35 | 60/40 | 45 | 14 | 4 | 10.1 | 15.4 |

By adjusting the solids content of the solution and the draining rate, coatings were repeated by fixing the ratio r at 55.3/44.7 and by varying the amount of coating deposited.

For these additional examples from Example 5, Table 5 lists the values of Q in μg/cm², the corresponding thickness e in nm, v in nm/h, $R_L$, and $\Delta T_L$.

The data from this third series of examples show there is an advantage to adding a $SiO_2$ material to the binder. Although the silicon oxide is not involved in the photocatalysis, it makes the coating more homogeneous and tends to enhance its durability. Although the ratio r is key, other parameters particularly Q (which preferably ranges between 15 and 45 μg/cm²) are also important in accounting both for the cost of the coating and the impact of its thickness on the optical appearance.

TABLE 5

|  | Q | e | v1 | $R_L$ | $\Delta T_L$ |
| --- | --- | --- | --- | --- | --- |
| EXAMPLE 15a | 17 | 110 | 42 | 8.5 | 1.5 |
| EXAMPLE 15b | 33 | — | 88 | 12.1 | 2.5 |
| EXAMPLE 15c | 49 | 460 | 130 | 11 | 0.8 |

The photocatalytic activity of the particles 5 may be further improved by doping them, by introducing dopants into the crystal lattice or by covering the particles with dopants comprising Fe, Cu, Ru, Mo, Bi, Ta, Nb, Co, Ni, or Va as described in patent WO 97/10185. One may also add a mineral binder comprising oxides which are not photocatalytic or only slightly photocatalytic in the crystallized state. For example, one may add to the dispersion a precursor for a silicon oxide such as tetraethoxysilane TEOS. In certain cases, the A/(B+M+Si) ratio mentioned above, which is optimal in the 40/60 to 60 to 40 range, may lie within the 35/65 to 40/60 and 65/35 to 60/40 ranges.

What is claimed is:

1. A coated substrate prepared by a process comprising:
   (a) preparing a substrate for deposition with a coating, wherein the coating comprises crystallized particles of an oxide of a metal A having photocatalytic properties, a mineral binder comprising at least one oxide of a metal B having photocatalytic properties, optionally at least one oxide of a metal M devoid of photocatalytic properties, and optionally at least one silicon oxide;
   (b) depositing the coating onto a surface of the substrate, by depositing the coating from liquid-phase dispersions containing oxides of the metals A and B, optionally the oxide of metal M and optionally the silicon oxide, in a relative proportion by weight of the metals and Si given by A/(B+M+Si), the relative proportion ranging from 60/40 to 40/60; and
   (c) allowing the coating to set;
   to provide the coated substrate, wherein the coating comprises crystallized particles of the oxide of metal A having photocatalytic properties incorporated into the coating using an at least partially crystallized mineral binder comprising the oxide of metal B also having photocatalytic properties in the crystallized state, optionally at least one oxide of a metal M devoid of photocatalytic properties and optionally a silicon oxide.

2. The coated substrate of claim 1, wherein the crystallized particles have a size of about 5 nm to about 80 nm.

3. The coated substrate of claim 1, wherein the mineral binder is at least partially in the form of grains having a size of between 5 nm to 25 nm.

4. The coated substrate of claim 1, wherein the coating comprises a partially crystallized mineral binder comprising $TiO_2$ and crystallized $TiO_2$ particles essentially in anatase form.

5. The coated substrate of claim 1, wherein at least one layer is inserted between the substrate and the coating.

6. The coated substrate of claim 5, wherein the at least one layer functions as a barrier to alkali metals or has an optical, antistatic, or adhesion function.

7. The coated substrate of claim 6, wherein the at least one layer is based on a Si compound or a doped metal oxide.

8. The coated substrate of claim 1, wherein the substrate comprises at least one transparent material of glass, plastic, or composite materials.

9. The coated substrate of claim 1, wherein the coating comprises silicon oxide.

10. The coated substrate of claim 1, wherein the at least one oxide of metal B is selected from the metals Ti, Zn, Sn, and W.

11. The coated substrate of claim 1, wherein the coating has a porosity of at least 40%.

12. A coated substrate prepared by a process comprising:
   (a) preparing a substrate for deposition with a coating, wherein the coating comprises crystallized particles of an oxide of a metal A having photocatalytic properties, a mineral binder comprising at least one oxide of a metal B having photocatalytic properties, optionally at least one oxide of a metal M devoid of photocatalytic properties, and optionally at least one silicon oxide;
   (b) depositing the coating onto a surface of the substrate, by depositing the coating from liquid-phase dispersions containing oxides of the metals A and B, optionally the oxide of metal M and optionally the silicon oxide, in a relative proportion by weight of the metals and Si given by A/(B+M+Si), the relative proportion ranging from 60/40 to 40/60; and
   (c) allowing the coating to set,
   to provide the coated substrate, wherein the coating comprises crystallized particles of the oxide of metal A having photocatalytic properties incorporated into the coating using an at least partially crystallized mineral binder comprising the oxide of metal B also having photocatalytic properties in the crystallized state, optionally at least one oxide of a metal M devoid of photocatalytic properties and optionally a silicon oxide, wherein the coating has coherence domains having a size of about 5 nm to about 20 nm.

13. The coated substrate of claim 12, wherein the coating comprises silicon oxide.

14. The coated substrate of claim 12, wherein the at least one oxide of metal B is selected from the metals Ti, Zn, Sn, and W.

15. The coated substrate of claim 12, wherein the coating has a porosity of at least 40%.

16. A coated substrate prepared by a process comprising:
   (a) preparing a substrate for deposition with a coating, wherein the coating comprises crystallized particles of an oxide of a metal A having photocatalytic properties, a mineral binder comprising at least one oxide of a metal B having photocatalytic properties, optionally at least one oxide of a metal M devoid of photocatalytic properties, and optionally at least one silicon oxide;
   (b) depositing the coating onto a surface of the substrate, by depositing the coating from liquid-phase dispersions containing oxides of the metals A and B, optionally the oxide of metal M and optionally the silicon oxide, in a relative proportion by weight of the metals and Si given by A/(B+M+Si), the relative proportion ranging from 60/40 to 40/60; and
   (c) allowing the coating to set,
   to provide the coated substrate, wherein the coating comprises crystallized particles of the oxide of metal A having photocatalytic properties incorporated into the coating using an at least partially crystallized mineral binder comprising the oxide of metal B also having photocatalytic properties in the crystallized state, optionally at least one oxide of a metal M devoid of photocatalytic properties, and optionally a silicon oxide, wherein the coating comprises a mineral binder comprising partially crystallized $TiO_2$ and crystallized $TiO_2$ particles essentially in anatase form and is present in an amount of between 15 and 45 $\mu g/cm^2$.

17. The coated substrate of claim 16, wherein the coating comprises silicon oxide.

18. The coated substrate of claim 16, wherein the at least one oxide of metal B is selected from the metals Ti, Zn, Sn, and W.

19. The coated substrate of claim 16, wherein the doped metal oxide is a fluorine-doped tin oxide.

20. The coated substrate of claim 16, wherein the coating has a porosity, calculated from the refractive index, of at least 40%.

* * * * *

UNITED STATES PATENT AND TRADEMARK OFFICE
CERTIFICATE OF CORRECTION

PATENT NO. : 6,720,066 B2  
DATED : April 13, 2004  
INVENTOR(S) : Talpaert et al.

Page 1 of 1

It is certified that error appears in the above-identified patent and that said Letters Patent is hereby corrected as shown below:

Title page,
Item [63], Related U.S. Application Data, should read:
-- Continuation of Application No. 09/655,146, filed on Sep. 5, 2000, now Pat. No. 6,465,088, which is a continuation of application No. PCT/FR99/00511, filed on Mar. 5, 1999 --

Column 1,
Line 4, the paragraph should read as follows:
-- This application is a continuation of application Ser. No. 09/655,146, filed Sep. 5, 2000, now U.S. Pat. No. 6,465,088, which is a continuation of the U.S. national phase designation of PCT application no. PCT/FR99/00511, filed Mar. 5, 1999. --

Signed and Sealed this

Twenty-ninth Day of June, 2004

JON W. DUDAS
*Acting Director of the United States Patent and Trademark Office*